United States Patent
Yang et al.

(10) Patent No.: US 12,160,303 B2
(45) Date of Patent: Dec. 3, 2024

(54) SYSTEMS AND METHODS FOR PROVIDING MESSAGING FOR UNMANNED AERIAL VEHICLES

(71) Applicant: Verizon Patent and Licensing Inc., Basking Ridge, NJ (US)

(72) Inventors: Jin Yang, Orinda, CA (US); Parvez Ahmad, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 416 days.

(21) Appl. No.: 17/557,325

(22) Filed: Dec. 21, 2021

(65) Prior Publication Data

US 2023/0198607 A1    Jun. 22, 2023

(51) Int. Cl.
*H04B 7/185* (2006.01)
*H04L 1/00* (2006.01)

(52) U.S. Cl.
CPC ....... *H04B 7/18506* (2013.01); *H04L 1/0003* (2013.01)

(58) Field of Classification Search
CPC ........................... H04B 7/18506; H04L 1/003
See application file for complete search history.

(56) References Cited

U.S. PATENT DOCUMENTS

| | | | | |
|---|---|---|---|---|
| 10,355,810 B1 * | 7/2019 | Muthuswamy | ....... | H04L 1/0009 |
| 10,686,502 B1 * | 6/2020 | Zhao | ..................... | H04B 7/0452 |
| 10,735,057 B1 * | 8/2020 | Zhao | ....................... | H04B 7/024 |
| 11,831,378 B2 * | 11/2023 | Elshafie | ................ | H04L 1/0016 |
| 2003/0007477 A1 * | 1/2003 | Ragan | .................. | G08B 3/1066 |
| | | | | 370/458 |
| 2003/0021243 A1 * | 1/2003 | Hamalainen | ........ | H04W 52/241 |
| | | | | 370/252 |
| 2007/0111692 A1 * | 5/2007 | Kuramoto | ............ | H04B 7/0814 |
| | | | | 455/277.1 |
| 2007/0211768 A1 * | 9/2007 | Cornwall | ............... | G01D 4/004 |
| | | | | 370/470 |
| 2015/0257081 A1 * | 9/2015 | Ramanujan | ............. | H04L 45/56 |
| | | | | 370/329 |
| 2018/0077617 A1 * | 3/2018 | Xue | ........................ | H04W 48/16 |
| 2019/0215840 A1 * | 7/2019 | Park | ....................... | H04W 72/53 |
| 2019/0312815 A1 * | 10/2019 | Altman | ................... | H04L 43/026 |
| 2019/0380052 A1 * | 12/2019 | Yang | .................... | H04W 72/23 |
| 2020/0313795 A1 * | 10/2020 | Xu | ........................ | H04B 7/0628 |
| 2021/0050938 A1 * | 2/2021 | Sarkis | .................... | H04L 1/0005 |
| 2021/0226737 A1 * | 7/2021 | Huang | ............. | H04W 52/0229 |
| 2021/0314112 A1 * | 10/2021 | Balasubramanian | ... | H04L 5/001 |
| 2021/0318981 A1 * | 10/2021 | Jurski | ................. | G06F 13/4282 |

(Continued)

*Primary Examiner* — Alex Skripnikov

(57) ABSTRACT

A method may include identifying a network slice to service an unmanned aerial vehicle (UAV) and assigning the identified network slice to the UAV. The method may also include receiving, from a user equipment (UE) device, a message intended for the UAV, transmitting the message to the UAV and receiving, from the UE device, information identifying an error rate associated with the message. The method may further include determining whether the error rate is greater than a threshold error rate and in response to determining that the error rate is greater than the threshold error rate, at least one of modifying a modulation and coding scheme (MCS) associated with transmitting the message to the UAV, or retransmitting the message to the UAV at least one time.

20 Claims, 8 Drawing Sheets

(56) References Cited

U.S. PATENT DOCUMENTS

| | | | |
|---|---|---|---|
| 2022/0078099 A1* | 3/2022 | Zhohov | H04W 24/08 |
| 2022/0182111 A1* | 6/2022 | Koteshwar Srinath | H04B 7/0854 |
| 2022/0264482 A1* | 8/2022 | Leroux | H04B 7/0617 |
| 2023/0035066 A1* | 2/2023 | Bae | H04W 72/1268 |
| 2023/0067166 A1* | 3/2023 | Elshafie | H04L 1/0016 |
| 2023/0089599 A1* | 3/2023 | Elshafie | H04L 5/0057 370/328 |
| 2023/0199730 A1* | 6/2023 | Rudolf | H04L 1/0003 370/329 |
| 2023/0239069 A1* | 7/2023 | Liu | H04L 1/0019 370/252 |
| 2023/0284078 A1* | 9/2023 | Pateromichelakis | H04W 56/0015 370/235 |
| 2023/0396362 A1* | 12/2023 | Shin | H04L 1/0057 |
| 2024/0073826 A1* | 2/2024 | Zhang | H04W 52/146 |

* cited by examiner

SYSTEMS AND METHODS FOR PROVIDING MESSAGING FOR UNMANNED AERIAL VEHICLES

BACKGROUND INFORMATION

The use of Unmanned Aerial Vehicles (UAVs), also referred to as drones, is increasing. Wireless wide area networks (WWANs) are now being used to provide command and control messaging in situations in which the drone is controlled from a remote location, such as for Beyond Visual Line of Site (BVLOS) operations. In some instances, providing reliable data services, such as providing reliable data services for cellular transmissions while the UAV is in flight, is needed to allow for regulatory approval associated with BLVOS operations.

DETAILED DESCRIPTION OF EXAMPLE EMBODIMENTS

The following detailed description refers to the accompanying drawings. The same reference numbers in different drawings may identify the same or similar elements.

Implementations described herein provide systems and methods for providing highly reliable communications to/from a UAV while the UAV is operating in a BVLOS operation. In one implementation, the modulation and coding scheme (MCS) used for transmissions to the UAV may be modified, such as the MCS index value associated with the transmissions may be lowered to increase the likelihood that the receiver (e.g., a UAV) will be able to accurately decode the message. In another implementation, the number of transmitters and/or receivers associated with transmissions to/from a UAV may be increased and/or a message may be transmitted/retransmitted a number of times to provide a greater probability that the receiver will be able to accurately decode the received message. In still another implementation, the power for transmissions may be increased to increase the resulting signal-to-interference-plus noise ratio (SINR), signal-to-noise ratio (SNR), etc., to increase the probability of accurately decoding the message at the receiver. In still other implementations, combinations of the above implementations (e.g., changing the MCS value, increasing the number of transmitters, increasing the number of transmissions, increasing the power level) may be used to increase the likelihood of successfully transmitting and accurately decoding messages to/from a UAV, such as command and control messages transmitted to a UAV over a wireless wide area network (WWAN) while the UAV is in flight.

Figure 1:
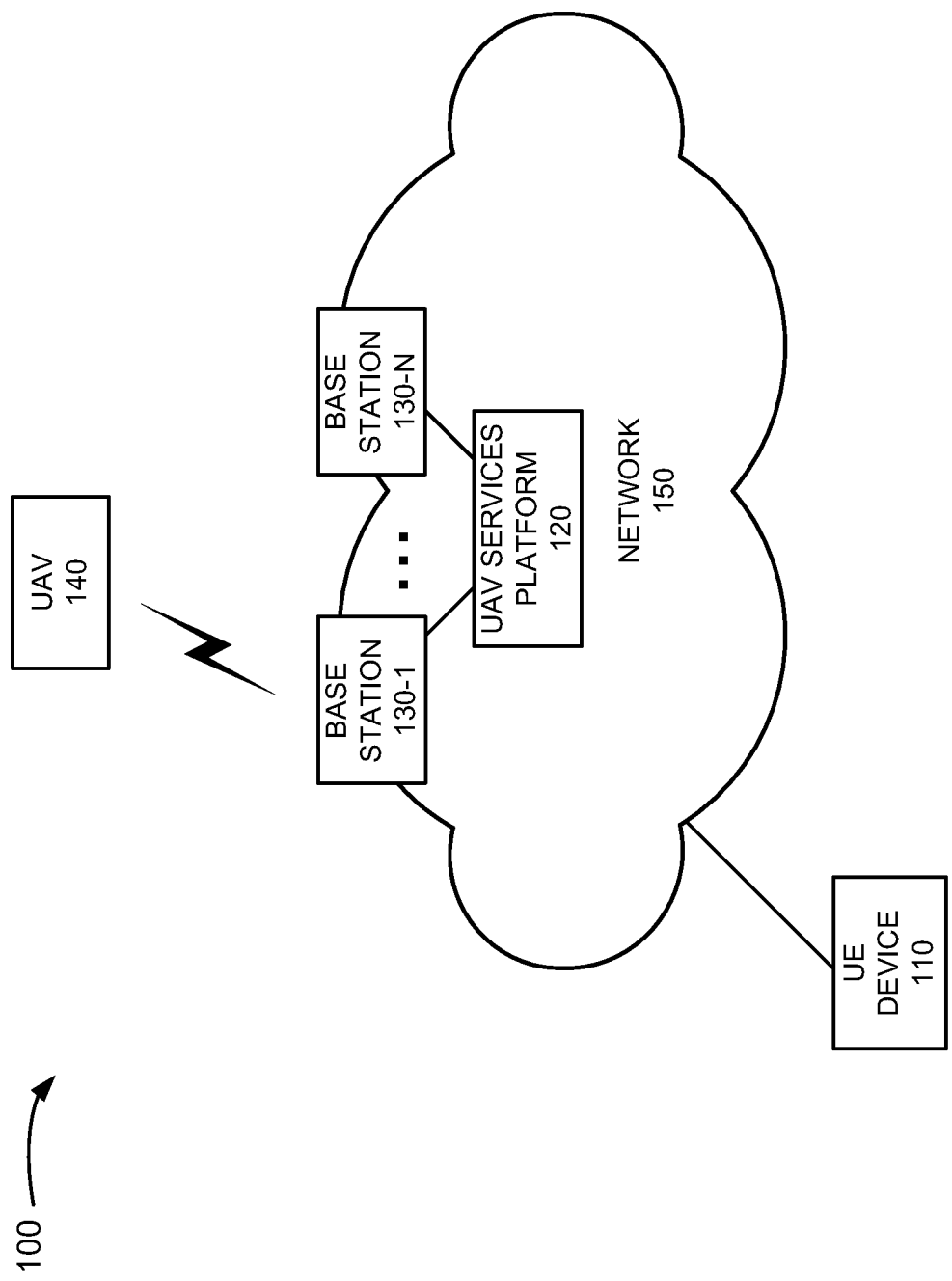
FIG. 1 illustrates an example environment in which systems and methods described herein may be implemented.

FIG. 1 is a diagram illustrating an example environment 100 in which systems and methods described herein may be implemented. Referring to FIG. 1, environment 100 includes user equipment (UE) device 110 (also referred to as UE 110), UAV services platform 120, base stations 130-1 to 130-N (referred to collectively as base stations 130 and individually as base station 130), UAV 140 and network 150.

UE 110 may include a desktop computer, laptop computer, tablet computer, server, wearable computer (e.g., eyeglasses or wristwatch), mobile phone (e.g., a smartphone) or some other computing device that includes communication functionality. In an exemplary implementation, UE 110 may provide commands to UAV 140 via network 150 and receive information (e.g., telemetry information, data associated with a flight, etc.) from UAV 140 via network 150, as described in detail below.

UAV services platform 120 may include one or more computing devices configured to interface with UE 110, base stations 130 and/or other devices in environment 100 to provide information associated with transmissions to UAVs, such as UAV 140. For example, UAV services platform 120 may store information regarding the particular modulation and coding scheme (MCS) to use for transmissions to UAV 140, a number of times to transmit/retransmit each message sent to UAV 140, a target signal-to-interference-plus-noise ratio (SINR), signal-to-noise ratio (SNR), or other power level related metric for transmissions to UAV 140, as well as other information, as described in detail below. In some implementations, UAV services platform 120 may include a number of distributed databases located in relative close proximity to base stations 130 that include detailed information regarding transmissions to UAV 140 before and during a flight.

Base stations 130 may be associated with a communication network, such as a Fifth Generation (5G) network, a Fourth Generation (4G) long term evolution (LTE) network, a sixth Generation (6G) network, etc. Each base station 130 may service a number of UAVs 140 and/or other user devices, such as UE 110, when the particular device is within radio frequency range of base station 130. For example, base stations 130 may be part of a radio access network (RAN) that wirelessly connects to UAV 140 to allow UE 110 to communicate with UAV 140 while operating in a BVLOS operation.

In one implementation, base station 130 may include 5G base station (e.g., a next generation NodeB (gNB)) that includes one or more radio frequency (RF) transceivers. For example, base station 130 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. For example, base station 130 may include a massive multiple-input, multiple-output (mMIMO) configuration (e.g., an 8×8 antenna configuration, a 16×16 antenna configuration, a 256×256 antenna configuration, etc.) to allow for multiple transmissions to be sent to UAV 140 in sequence or simultaneously, as described in detail below. In other implementations, base station 130 may also include a 4G base station (e.g., an evolved NodeB (eNodeB)) or a 6G base station that communicates wirelessly with UAVs 140 located within the radio frequency range of base station 130.

UAV 140 may include an aircraft (e.g., a single rotor aircraft, multirotor aircraft or fixed wing aircraft) that receives control signals from a controller, such as UE 110 to control the flight of UAV 140. In some implementations, UAV 140 may include cellular communication capability (e.g., 5G communication capability, 4G LTE communication capability, 6G communication capability, etc.) to allow UAV 140 to receive command and control messages (e.g., receive commands from UE 110 while UAV 140 is operating in a BVLOS environment), as well as transmit data and information (e.g., transmit telemetry information, images taken by a camera included in UAV 140, etc.) to UE 110. UAV 140 may also include a short range wireless communication capability (e.g., WiFi) to allow UAV 140 to receive data from and transmit data to devices and systems located relatively close (e.g., within line of sight) to UAV 140.

Network 150 may include one or more wired, wireless and/or optical networks that are capable of receiving and transmitting data, voice and/or video signals. For example, network 150 may include one or more public switched telephone networks (PSTNs) or other type of switched network. Network 150 may further include one or more satellite networks, one or more packet switched networks, such as an Internet protocol (IP) based network, a software defined network (SDN), a local area network (LAN), a WiFi network, a Bluetooth network, a wide area network (WAN), a wireless WAN (WWAN), a 5G network, a 4G LTE Advanced network, a 6G network, an intranet, or another type of network that is capable of transmitting data. Network 150 may also include a core network that provides packet-switched services and wireless IP connectivity to various components in environment 100, such as UAVs 140, to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., hundreds or more) of UEs 110 and UAVs 140, as well as multiple networks 150 that connect UEs 110 to UAVs 140. Environment 100 may also include elements, such as gateways, routers, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
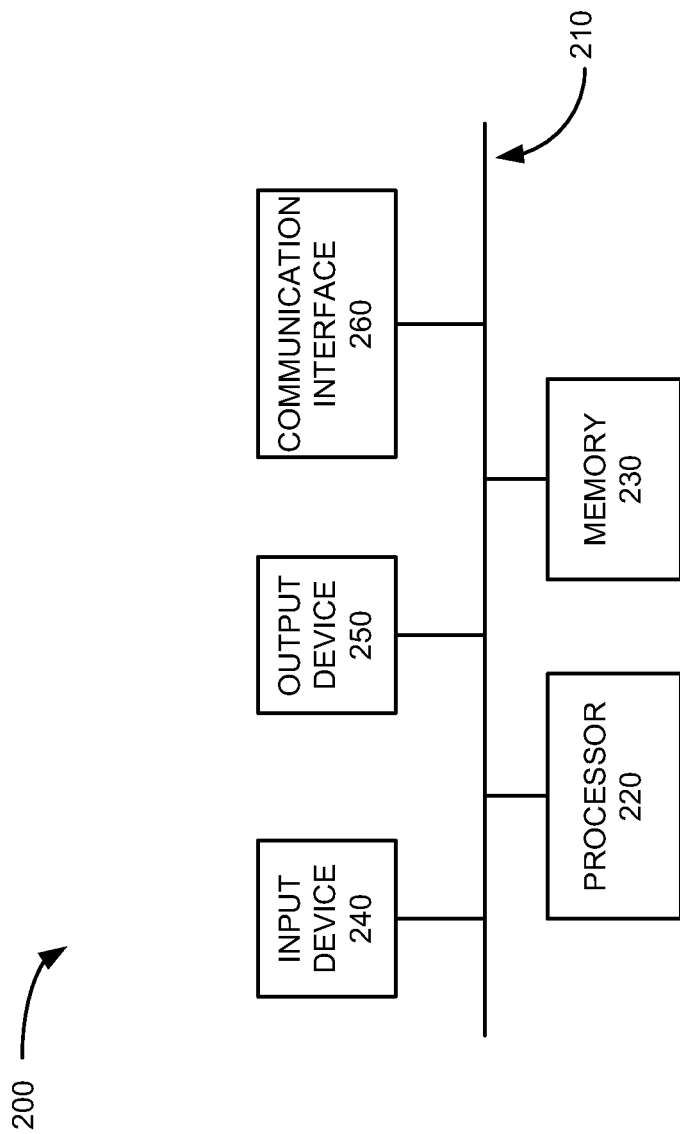
FIG. 2 is a block diagram of components implemented in one or more of the elements of the environment of FIG. 1 in accordance with an example implementation.

FIG. 2 illustrates an exemplary configuration of a device 200. One or more devices 200 may correspond to or be included in UE 110, UAV services platform 120, base station 130, UAV 140 and/or other devices included in environment 100. Referring to FIG. 2, device 200 may include bus 210, processor 220, memory 230, input device 240, output device 250 and communication interface 260. Bus 210 may include a path that permits communication among the elements of device 200.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SSD). Memory 230 may also include a magnetic and/or optical recording medium (e.g., a hard disk) and its corresponding drive.

Input device 240 may include a mechanism that permits a user to input information, such as a keypad, a keyboard, a mouse, a pen, a microphone, a touch screen, voice recognition and/or biometric mechanisms, etc. Output device 250 may include a mechanism that outputs information to the user, including a display (e.g., a liquid crystal display (LCD)), a speaker, etc. In some implementations, device 200 may include a touch screen display may act as both an input device 240 and an output device 250.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data. Communication interface 260 may also include a modem or an Ethernet interface to a LAN or other mechanisms for communicating with elements in a network.

The exemplary configuration illustrated in FIG. 2 is provided for simplicity. It should be understood that device 200 may include more or fewer components than illustrated in FIG. 2. For example, for device 200 implemented in UAV 140, device 200 may include a positioning system/satellite navigation system, such as a global positioning system (GPS) component, which may provide position information in relation to a standard reference frame, sensors and control circuitry to control and/or monitor the flight of UAV 140.

In an exemplary implementation, device 200 performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD), etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
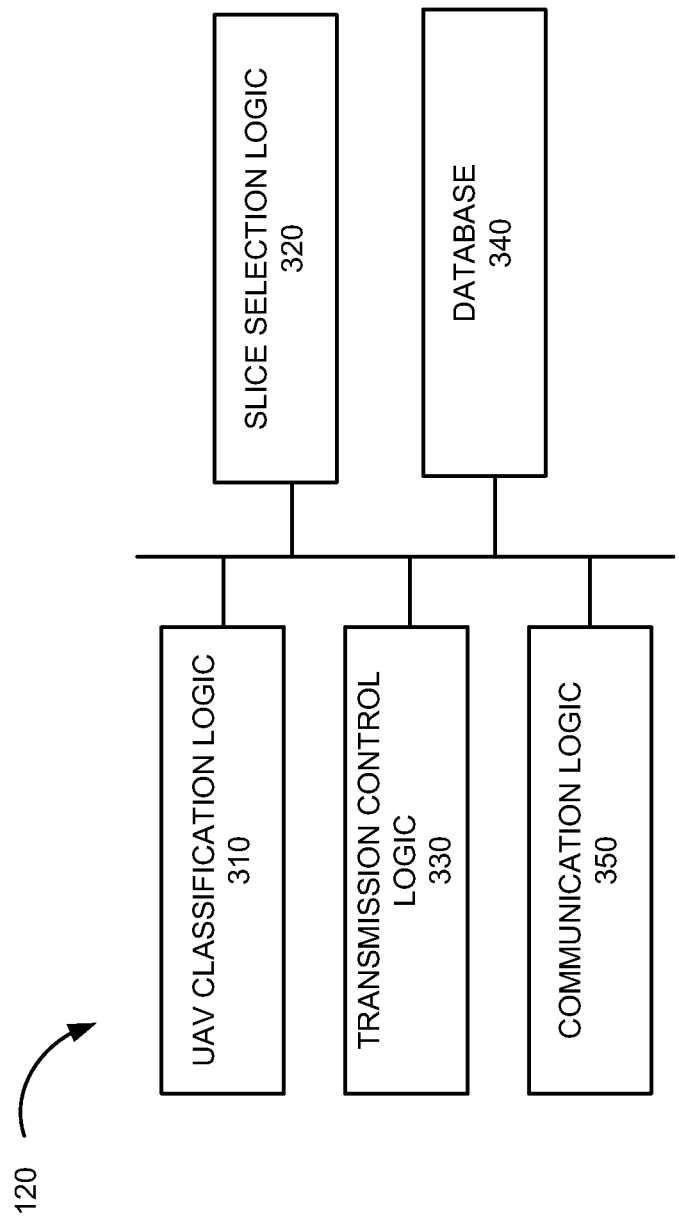
FIG. 3 illustrates example logic components implemented in the UAV services platform in accordance with an example implementation.

FIG. 3 is a block diagram of components implemented in UAV services platform 120 in accordance with an exemplary implementation. Referring to FIG. 3, UAV services platform 120 may include UAV classification logic 310, slice selection logic 320, transmission logic 330, database 340 and communication logic 350. These elements may be implemented by processor 220 executing instructions stored in memory 230 of base station 130. In alternative implementations, these components or a portion of these components may be located externally with respect to UAV services platform 120.

UAV classification logic 310 may include logic to identify types of UAVs 140 and classify the UAVs 140. For example, UAV classification logic 310 may identify UAV 140 based on, for example, the type and/or usage associated with the UAV 140, a quality of service (QoS) metric or service level agreement (SLA) metric associated with a user operating the UAV 140 (or a number of UAVs 140), etc. For example, UAV classification logic 310 may identify UAVs 140 associated with commercial uses, such as the delivery of packages, taking aerial photographs for a business purpose (e.g., for a realtor), emergency uses (e.g., for a hospital), etc. UAV classification logic 310 may also identify UAVs 140 associated with recreational flying, etc. In one implementation, the classification regarding business or recreational purposes may be made based on a UAV identifier that identifies the type/purpose of UAVs 140. UAV classification logic 310 may also access a user database (e.g., database 340) to identify a QoS, SLA or other requirement or metric associated with a user flying one or more UAVs 140. UAV classification logic 310 may then classify the UAVs 140 in different categories based on their types, uses, and/or QoS or SLA metrics, etc.

Slice selection logic 320 may include logic to select network slices to service UAVs 140. The term "network slice" (also referred to as "slice") as used herein refers to a logical network including a radio access network (RAN) and a core network (e.g., a portion of network 150) that provides telecommunication services and network capabilities that have certain characteristics and requirements, such as reliability, latency, jitter, bandwidth, etc. In one implementation, slice selection logic 320 may select a network slice for a UAV 140 based on information generated by UAV classification logic 310. For example, slice selection logic 320 may identify a slice that has a very high reliability, such as a block error rate of 0.00001 or less, a low latency, etc., to service a particular UAV 140 that is operating in a BVLOS environment and/or performing an important task, such as delivering equipment or being used for another commercial purpose, and identify a slice having a lower reliability, higher latency, jitter, etc., for a UAV 140 not operating in a BVLOS environment and/or for recreational purposes. Slice selection logic 320 may also access database 340 to identify a target reliability metric (e.g., a target BLER), QoS level or SLA associated with a party operating UAVs and that has subscribed to particular levels of service (e.g., reliability, bandwidth requirement, latency, jitter) associated with one or more UAVs 140 owned/operated by the party.

Transmission logic 330 may include logic configured to generate messages for transmissions using a default MCS index value associated with transmission to UAVs 140, as well as identify the number of transmitters or transmitter branches to use for transmissions to/from UAVs, the number of retransmissions to make for messages to UAVs, power levels associated with transmissions to UAVs, etc. The MCS index values, number of transmitters to use, number of retransmissions, the power levels, etc., may be stored in database 340. Transmission logic 330 may also generate the messages for transmission based on a target block error rate (BLER) for messages transmitted to UAV 140. For example, in one implementation, the target BLER for messages received by UAV 140 may be 0.00001. The target BLER may be stored in transmission control logic 330 and/or database 340.

Figure 4:
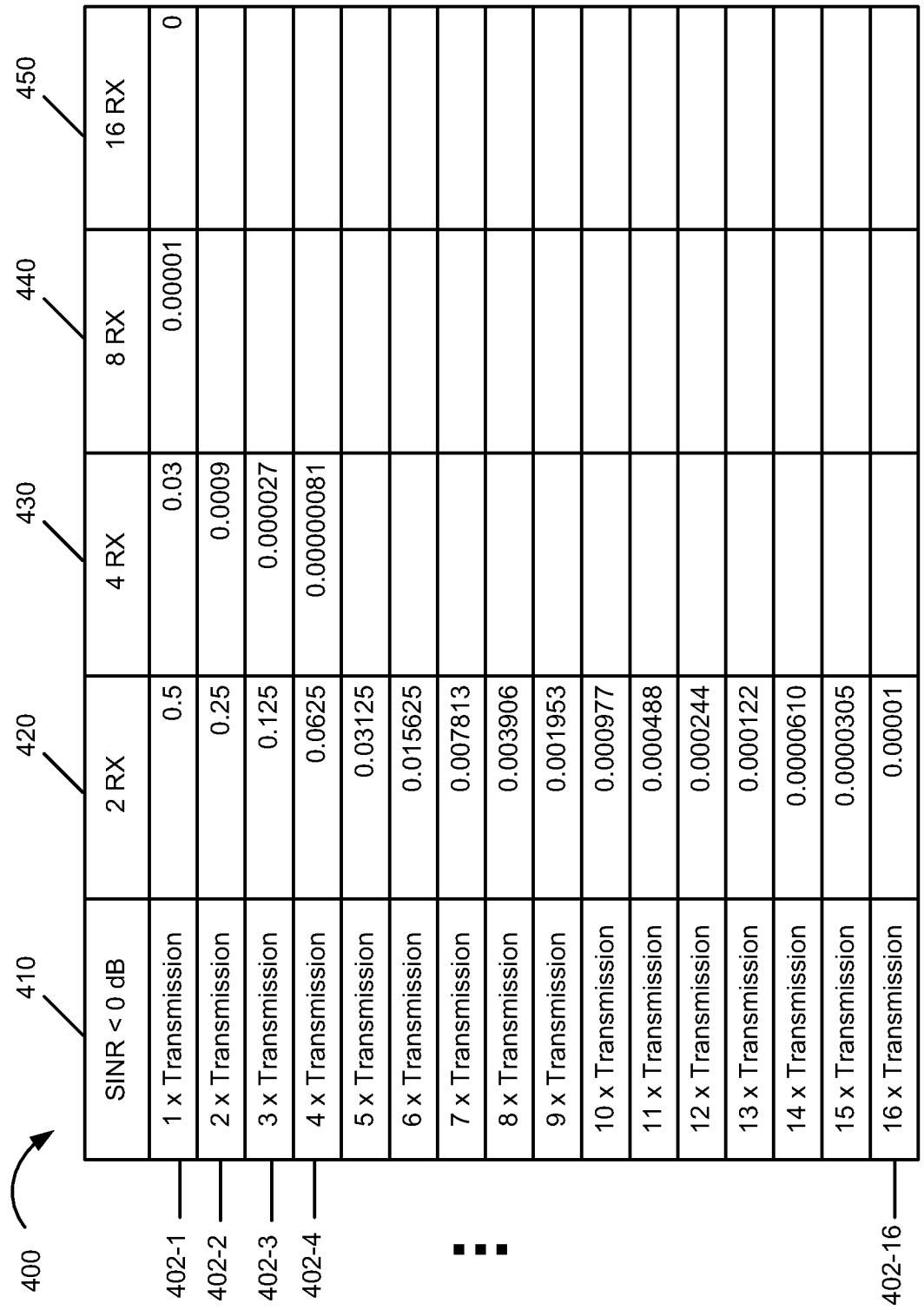
FIG. 4 illustrates an example table stored in the UAV services platform of FIG. 1 in accordance with an example implantation.

Database 340, as discussed above, may store information regarding transmissions to UAVs 140 in environment 100, such as a default MCS to use for transmitting messages, the number of transmissions/retransmissions for each message, power levels for the transmissions, etc. For example, FIG. 4 illustrates an exemplary table 400 stored in database 340 in accordance with an exemplary implementation. Referring to FIG. 4, table 400 stores information indicating the number of transmissions of a message needed from base station 130 to UAV 140 to achieve a target BLER. For example, assume that table 400 is associated with a target SINR of less than 0 dB and that the target BLER for transmissions to UAV 140 is set at 0.00001. Further assume that UAVs 140 operating in environment 100 include multiple receive antennas (i.e., two receive antennas, four receive antennas, eight receive antennas or 16 receive antennas in this example).

In this example, column 410 indicates the number of transmissions and columns 420, 430, 440 and 450 indicate the corresponding BLER associated with the particular number of transmissions with two, four, eight and 16 receivers, respectively. For example, row 402-1 indicates that a single transmission to a UAV 140 using two receive antennas will result in a BLER of 0.5, a single transmission to a UAV 140 using four receive antennas will result in a BLER of 0.03, a single transmission to a UAV 140 using eight receive antennas will result in a BLER of 0.00001, and a single transmission to a UAV 140 using 16 receive antennas will result in a BLER of 0. Therefore, in a scenario in which base station 130 transmits a message a single time, UAV 140 would require at least eight receive antennas to be operating to meet the target BLER of 0.00001.

To achieve the target reliability BLER of 0.00001 for a UAV 140/receiver that includes two receive antennas, base station 130 must transmit the packet/message 16 times, as indicated in row 402-16 at column 420. Similarly, row 402-4 at column 430 indicates that to achieve the target BLER of 0.00001 or less for a receiver (e.g., UAV 140) that includes four receive antennas, base station 130 must transmit the packet four times. As further shown in row 402-1 at columns 440 and 450, for a receiver that includes eight or 16 receive antennas, the target reliability can be achieved without retransmission of packets. That is, a single message transmitted to a UAV 140 using eight or 16 receive antennas will be decoded at the UAV and will result in a BLER of 0.00001 or less.

Returning to FIG. 3, database 340 may also include a table that stores information regarding a default MCS index value associated with transmissions to UAV 140. For example, database 340 may store information indicating that the default MCS index value associated with transmissions to UAV 140 is 19, 14, 10, etc. The default index value corresponds to a particular MCS scheme used for transmitting the message. Database 340 may further store information indicating changes to be applied to the MCS index value for subsequent transmissions to UAV 140 when a target BLER associated with an initially transmitted message(s) does not meet the target BLER, as described in detail below.

Communication logic 350 may include logic for communicating with devices in environment 100 via wired, wireless or optical mechanisms. For example, communication logic 350 may transmit data to and receive data from UE 110, base stations 130 and/or UAV 140. Communication logic 350 may also communicate with other devices in environment 100. For example, communication logic 350 may include one or more transceivers and one or more antennas for transmitting and receiving RF data, a modem or an Ethernet interface to a LAN or other mechanisms for communicating with elements in a network. Base station 130 may communicate with UAV services platform 120 to determine the number of transmissions based on, for example, the antenna configuration of the serving base station 130 and the antenna configuration of UAV 140, as described in detail below.

Although FIG. 3 shows exemplary components of UAV services platform 120, in other implementations, UAV services platform 120 may include fewer components, different components, differently arranged components, or additional components than depicted in FIG. 3. In addition, in other implementations, some or all of the components illustrated in FIG. 3 may be implemented in other devices, such as in base station 130.

Figure 5:
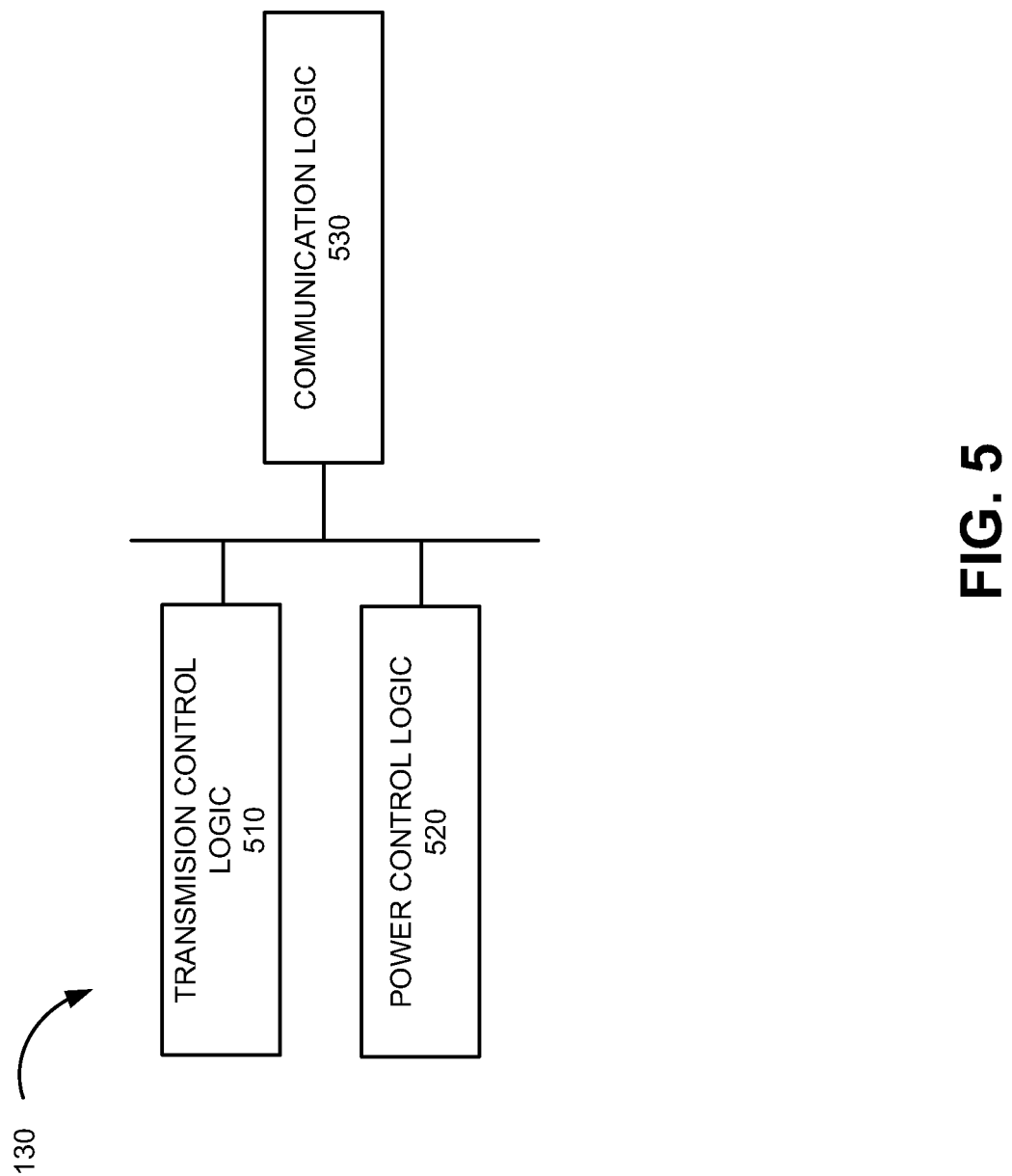
FIG. 5 illustrates example logic components implemented in a base station of FIG. 1 in accordance with an example implementation.

FIG. 5 is a functional block diagram of components implemented in base station 130 in accordance with an exemplary implementation. Referring to FIG. 5, base station 130 may include transmission control logic 510, power control logic 520 and communication logic 530. These elements may be implemented by processor 220 executing instructions stored in memory 230 of base station 130. In alternative implementations, these components or a portion of these components may be located externally with respect to base station 130.

Transmission control logic 510 may include logic configured to transmit messages, such as command and control messages, to UAV 140. For example, UE 110 may transmit a command to control the flight of UAV 140 operating in a BVLOS operation via network 150, which may be forwarded to a base station 130 within RF range of UAV 140. Transmission control logic 510 may receive the message, identify that the message is intended for a UAV, and provide specialized handling of the message.

For example, in some implementations, transmission control logic 510 may communicate with UAV services platform 120 to identify a particular default MCS to use for transmissions to UAV 140, identify number of transmitters (e.g., transmitter branches or elements) at base station 130 to use to transmit the message, the number of times to transmit the message to UAV 140, the power level to use to transmit the message, etc. For example, as described above, base station 130-1 may include multiple transmitters to allow multiple duplicate messages to be transmitted to UAV in sequence or in parallel. Base station 130-1 may also interleave portions of a message and send the portions via multiple transmitter elements/branches.

Transmission control logic 510 may also communicate with UAV services platform 120 to identify how to modify transmissions to UAV 140 in situations in which the reliability, such as the BLER associated with transmissions received by UAV 140 are not within the target reliability threshold. In such situations, transmission control logic 510 may receive information indicating that the MCS index value is to be lowered, the number of times that the message is transmitted/retransmitted to UAV 140 is to be increased, the number of antenna elements used to transmit the message is to be increased, the power level for transmissions is to be increased, etc.

Power control logic 520 may include logic configured to adjust a power level associated with transmissions to UAV 140. For example, if the BLER for transmissions to UAV 140 is above a target BLER, base station 130 may communicate with UAV services platform 120 to identify an adjusted power level for transmissions. In this case, power control logic 520 may adjust the power level accordingly to improve the SINR, SNR, etc., for messages transmitted to UAV 140.

Communication logic 530 may include one or more transceivers that base station 130 uses to communicate with other devices via wired, wireless or optical mechanisms. For example, communication logic 530 may include one or more RF transmitters, receivers and/or transceivers and one or more antennas for transmitting and receiving RF data. Communication logic 530 may also include a modem or an Ethernet interface to a LAN or other mechanisms for communicating with elements in a network.

Although FIG. 5 shows exemplary components of base station 130, in other implementations, base station 130 may include fewer components, different components, differently arranged components, or additional components than depicted in FIG. 5. For example, in some implementations, the information associated with modifying transmissions to UAV 140 described above as being stored in UAV services platform 120 may alternatively be stored in base station 130.

Figure 6:
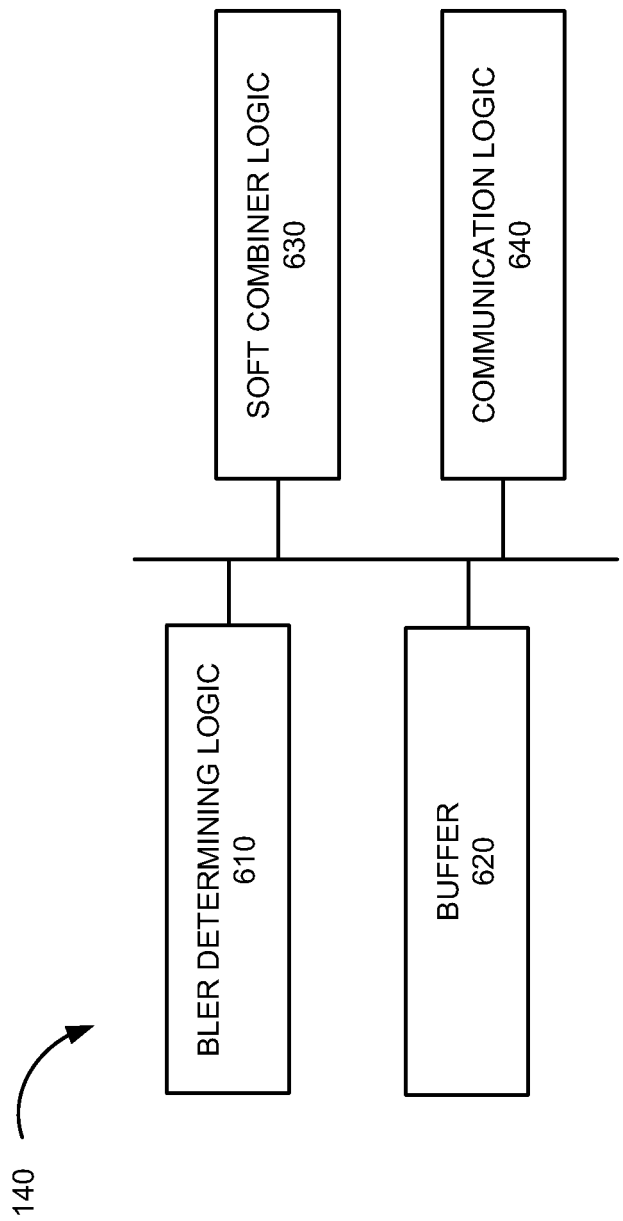
FIG. 6 illustrates example logic components implemented in the UAV of FIG. 1 in accordance with an example implementation.

FIG. 6 is a functional block diagram of components implemented in UAV 140 in accordance with an exemplary implementation. Referring to FIG. 6, UAV 140 may include block error rate (BLER) determining logic 610, buffer 620, soft combiner logic 630 and communication logic 640. These elements may be implemented by processor 220 executing instructions stored in memory 230 of UAV 140. In alternative implementations, these components or a portion of these components may be located externally with respect to UAV 140.

BLER determining logic 610 may include logic to determine a BLER for transmissions from base stations 130 to UAV 140. For example, BLER determining logic 610 may decode each messages from UAV 140 and use a cyclic redundancy check (CRC) code or other error check code to determine a BLER associated with each block received by UAV 140. In one implementation, UAV 140, via communication logic 640, may forward information identifying the determined BLER to base station 130 in an acknowledgement message associated with a received transmission.

Buffer 620 may include one or more memories used to store received messages/packets. In some implementations in which the received message was determined to have a BLER that is higher than a target BLER, the information stored in buffer 620 may be used by soft combiner logic 630 to attempt to accurately decode or reconstruct the received packet without requiring additional retransmissions of the packet. For example, soft combiner logic 630 may include logic to combine portions of erroneous packets to attempt to create a packet without errors and/or having a BLER that is lower than the target BLER.

Communication logic 640 may include one or more transceivers that UAV 140 uses to communicate with other devices via wired, wireless or optical mechanisms. For example, communication logic 640 may include one or more RF transmitters, receivers and/or transceivers and one or more antennas for transmitting and receiving RF data. As described above, in some implementations, UAVs 140 may include multiple receivers (e.g., two, four, eight, 16, etc.), as well as multiple transmitters. The multiple receivers, transmitters and/or transceivers included in communication logic 640 may enable UAV 140 to decode messages accurately to achieve the target BLER. Communication logic 540 may also include a modem or an Ethernet interface to a LAN or other mechanisms for communicating with elements in a network.

Although FIG. 6 shows exemplary components of UAV 140, in other implementations, UAV 140 may include fewer components, different components, differently arranged components, or additional components than depicted in FIG. 6.

Figure 7A:
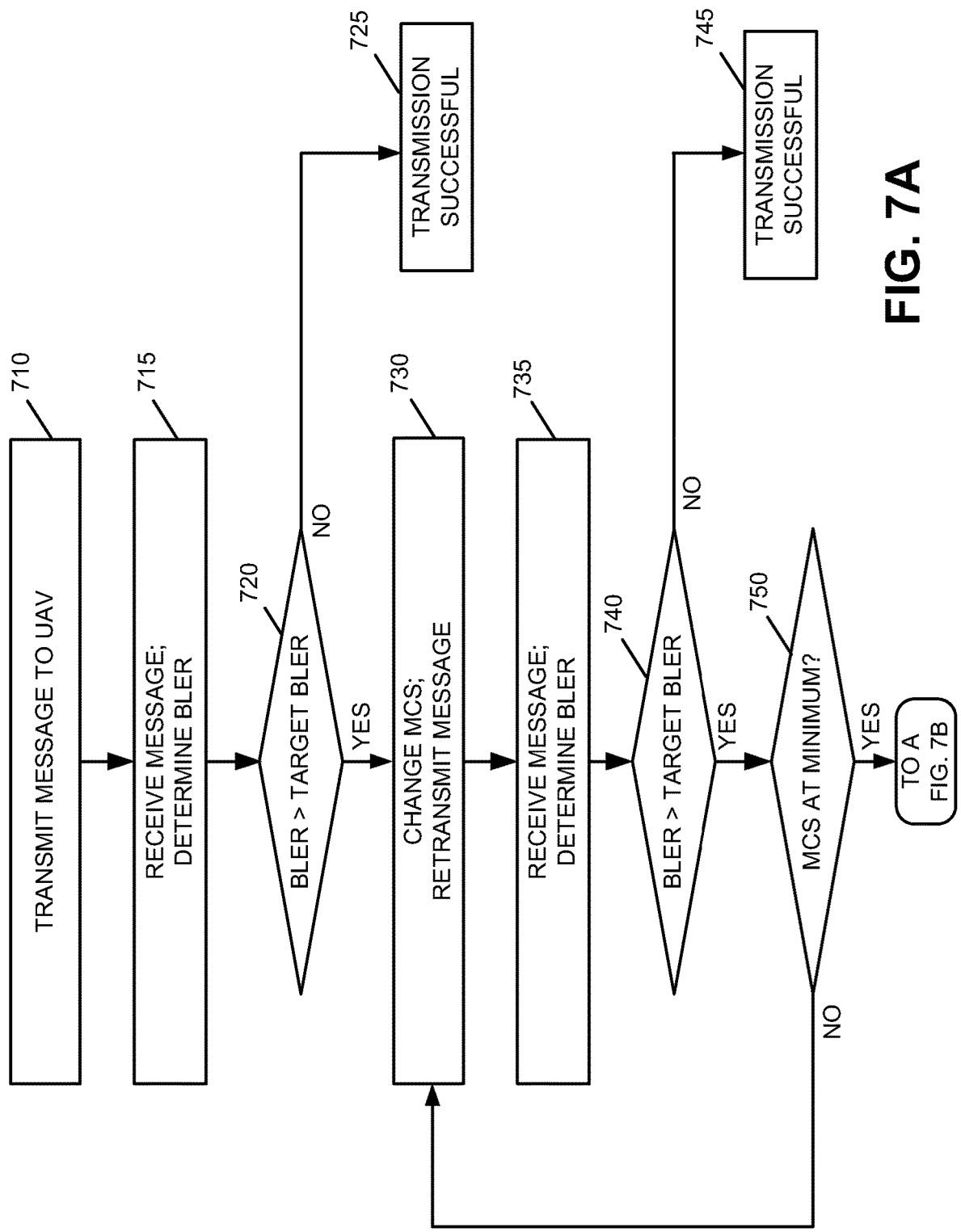
FIGS. 7A and 7B are flow diagrams illustrating processing associated with transmitting messages in the environment of FIG. 1 in accordance with an example implementation.
Figure 7B:
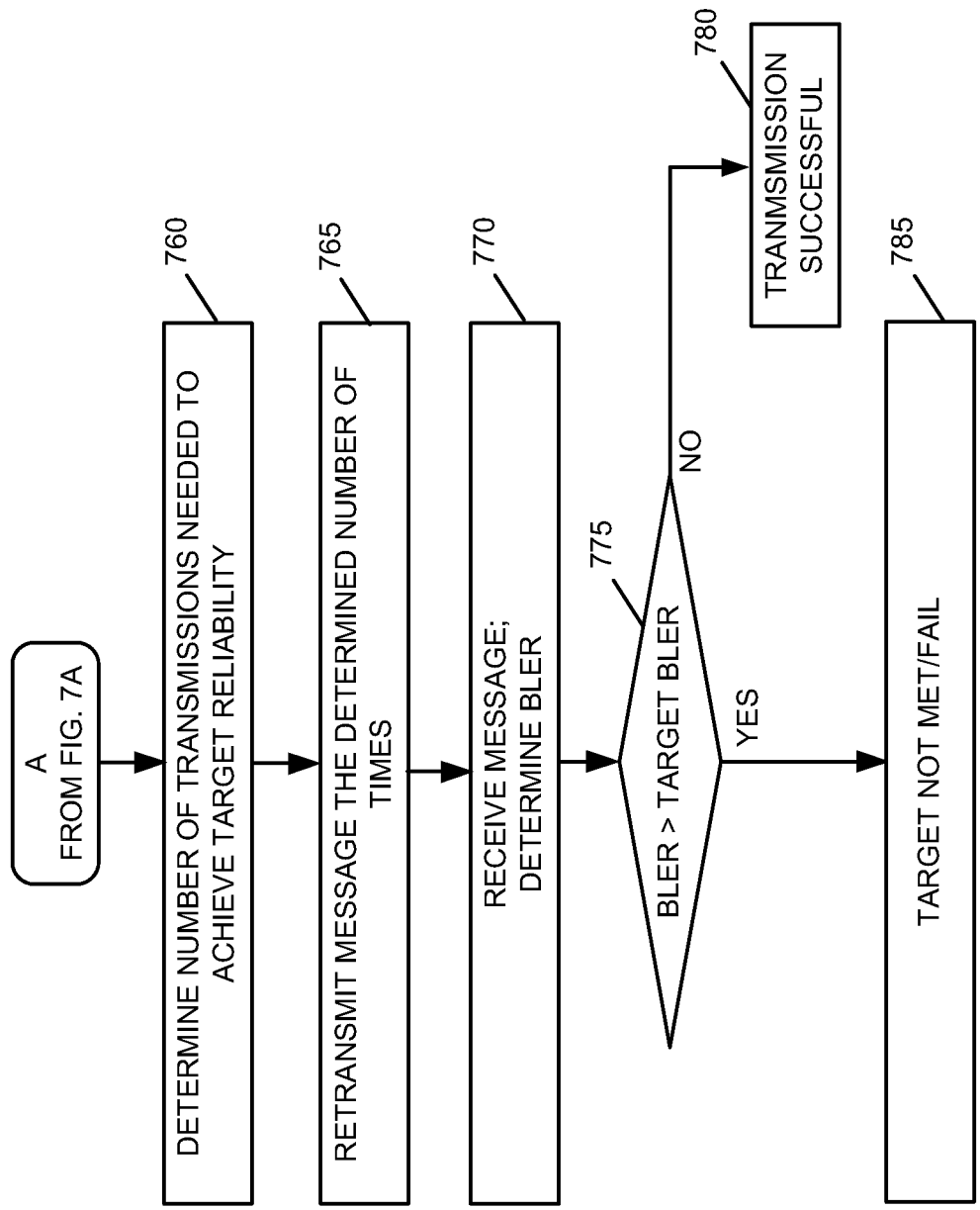

FIGS. 7A and 7B are flow diagrams illustrating processing associated with transmitting and receiving messages in environment 100 in accordance with an exemplary implementation. Processing may begin with UE 110 attempting to establish a connection with UAV 140. For example, assume that UE 110 is operated by an entity wishing to control (e.g., provide command and control instructions) to UAV 140 in a BVLOS operation. In this case, UE 110 may access network 150 and transmit a command and control message intended for UAV 140. Assume that UAV services platform 120 or another device in network 150 receives the message, identifies that the message is intended for UAV 140 and the service provider associated with network 150 assigns a network slice to communications to/from UAV 140, as described above.

For example, in one implementation, the service provider associated with network 150 may identify a network slice to assign to UAV 140 and the assigned network slice may have a particular BLER, QoS, SLA, etc. The service provider may assign a slice identifier (ID) with a special subscriber group ID that is dedicated to UAVs, such as UAV 140. The particular slice may correspond to a particular BLER and scheduler parameters having different reliabilities. In another implementation, the network slice may be associated with a public land mobile network (PLMN) identifier dedicated to a private network. In this example, assume that the BLER associated with the slice assigned to UAV 140 is set at 0.00001, as opposed to a BLER of 0.1 for typical communications not directed to UAVs 140. In addition, the number of transmitters and/or receivers, BLER and other parameters may be set up differently for communications to/from UAVs 140, as described above.

Further assume that the slice is assigned, base station 130-1 receives the message and identifies that the message from UE 110 is intended for UAV 140. That is, the service provider associated with network 150 may forward the message from UE 110, via the selected slice, to a base station 130 (e.g., base station 130-1) that is able to service UAV 140. Base station 130-1 receives the message intended for UAV 140. Further assume that base station 130-1 accesses UAV services platform 120 to identify the MCS index value for the transmission(s), the number of transmitter elements to use for transmitting the message, the number of duplicate messages to send, the power to be used for transmissions to UAV 140, etc.

Base station 130-1 may then transmit the message to UAV 140 in accordance with the determined parameters (block 710). Assume that UAV 140 receives the message and decodes the message (block 715). UAV 140 (e.g., BLER determining logic 610) may also determine an error rate associated with the decoded message, such as a BLER (block 715). UAV 140 may also transmit an acknowledgement message to base station 130-1 indicating that the message has been received. The acknowledgement message may include information identifying the determined BLER and a channel quality index (CQI) value associated with the channel between base station 130-1 and UAV 140. Base station 130-1 receives the acknowledgement message and determines if the reliability and/or error rate associated with the transmission is greater than target reliability/error rate threshold (block 720). For example, base station 130-1 may determine if the BLER is greater than the target BLER of 0.00001 in this example.

If the BLER is not greater than the target BLER (e.g., a BLER of 0.00001) (block 720—no), this indicates that the transmission was successful (block 725). If, however, BLER is greater than the target BLER, such as the BLER is 0.1 (block 720—yes), base station 130-1 may modify the MCS associated with transmissions to UAV 140 (block 730). For example, transmission control logic 510 of base station 130-1 may communicate with UAV services platform 120 and determine that in situations in which the BLER is greater than the target BLER, base station 130-1 is to reduce the MCS index value associated with the initial transmission by one or two or more. For example, the MCS index value associated with the original transmission to UAV may be 19, which may correspond to a CQI value of 10. Transmission control logic 510 may receive information from UAV services platform 120 indicating that base station 130 is to reduce the MCS for transmissions to UAV 140 from, for example, 19 to 14, which corresponds to a CQI offset of 2. In this case, transmission control logic 510 may receive information from UAV services platform 120 indicating that base station 130 is to reduce the MCS index value for subsequent transmissions to UAV 140 from, for example, 19 to 14. Alternatively, if the MCS index value associated with the original transmission to UAV 140 was 4, transmission control logic 510 may receive information from UAV services platform 120 indicating that the MCS index value should be reduce from 4 to 1. In each case, base station 130-1 may reduce the MCS index value for subsequent transmissions to UAV 140. As described above, base station 130-1 may store information indicating the actual MCS used for transmissions that correspond to particular MCI index values. The actual MCS corresponding to the MCS index values may be in accordance with 3rd Generation Partnership Project (3GPP) standards. As also described above, in some implementations, base station 130-1 may not need to access UAV services platform 120 to determine the modified MCS index value. That is, the information indicating how to modify the MCS index value after a failed transmission may be stored in base station 130-1.

In each case, base station 130-1 may use the modified MCS index value and retransmit the message using the modified MCS corresponding to the new/modified MCS index value (block 730). UAV 140 receives and decodes the retransmitted message and determines the BLER (block 735). UAV 140 may transmit an acknowledgement along with the BLER associated with the retransmitted message to base station 130-1. Base station 130-1 receives the acknowledgement message and determines if the reliability (e.g., the BLER) is greater than the target BLER (block 740).

If the BLER is not greater than the target BLER, such as the BLER is 0.00001 or less (block 740—no), this indicates that the transmission was successful (block 745). If, however, the reliability (e.g., BLER) is greater than the target BLER, such as the BLER is 0.001 (block 740—yes), base station 130-1 may determine if the current MCS used to encode the message is at a minimum value (block 750). For example, base station 130-1 may determine if the MCS index value is zero or some other minimum value.

If the current MCS index value is not at the minimum (block 750—no), base station 130-1 may lower the MCS index value and retransmit the message using the MCS corresponding to the lowered MCS index value (block 730) and processing may continue as described above with respect to blocks 730-750. If, however, the MCS index value is at the minimum value (block 750—yes), transmission control logic 510 of base station 130-1 may determine the number of times the message should be transmitted to attempt to achieve the target reliability (FIG. 7B, block 760). For example, in one implementation, base station 130-1 may access UAV services platform 120 and receive information (e.g., from database 340) indicating that UAV 140 has four receivers. In this case, transmission control logic 510 of base station 130-1 may receive information from UAV services platform 120 (i.e., table 400) indicating that the message to UAV 140 should be transmitted four times to achieve the target reliability. For example, row 402-4 at column 430 in table 400 indicates that four transmissions to a UAV 140 that includes four receivers should result in a BLER of 0.00000081, which is less than the target BLER of 0.00001.

Base station 130-1 may then retransmit the message to UAV 140 four times (block 765). The four messages may be transmitted in sequence, or in parallel in situations in which base station 130-1 is able to use four transmitters. In each case, UAV 140 receives the transmissions and determines the BLER (block 770). Base station 130-1 may then transmit an acknowledgment to base station 130-1 which includes the BLER. Base station 130-1 determines if the BLER associated with the retransmitted messages is greater than the target BLER (block 775). For example, in this case assume that the BLER determined by UAV 140 was 0.00000081, which is not greater than the target BLER of 0.00001 (block 775—no). In this case, this indicates that the retransmissions to UAV 140 were successful (block 780).

If, however, the BLER is greater than the target BLER (block 775—yes), this indicates the target reliability has not been met (block 785). In some implementations, this may also indicate a failure (block 785). In this case, base station 130-1 may retransmit the message at a higher power level, continue to retransmit the message sequentially or in parallel multiple times, etc., until the target BLER is achieved. In other implementations, UAV 140 may soft combine data from message blocks with errors to attempt to decode the messages and achieve the target BLER. Once the target BLER is achieved, base station 130-1 may continue to use the current MCS and/or transmit the message the predetermined number of times to achieve the target BLER.

In other implementations, after a successful message is transmitted, base station 130-1 may revert to the default MCS index value and a default number of messages to transmit to UAV 140. Base station 130-1 may also continue to monitor the BLER associated with transmitted messages and dynamically modify the MCS index values and corresponding MCS, the number of messages to transmit, the number of transmitters to use, power levels, etc., based on the BLER associated with the messages transmitted to UAV 140. In other implementations, base station 130-1 may dynamically modify the MCS index values, the number of messages to transmit, the number of transmitters to use, power levels for transmissions, etc., based on CQI values or other channel related metrics associated with connections to UAV 140. In some implementations, if a flight path for a UAV 140 is known, UAV services platform 120 may be able to tailor the number of transmissions based on the antenna configuration of the serving base stations 130, antenna configuration of UAV 140, as well as the particular flight path. For example, if a flight path is in an area with typically poor CQI values, UAV services platform 120 may increase the number of transmissions and/or decrease the MCS index associated with the transmissions.

Implementations described provide for reliable communications to/from a UAV. This allows a UAV operator to be assured of being able to control a UAV while operating in a BVLOS operation. Implementations described herein also allow a service provider to modify parameters associated with transmissions to/from a UAV based on the particular network conditions. This allows service providers to optimize use of network resources while also ensuring adequate support for UAVs. For example, in situations in which the bandwidth requirements associated with command and control messages to a UAV are relatively low, the service provider may use a default MCS for transmissions that may not support a high bandwidth, but result in greater reliability.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been described above with respect to transmitting messages, such as command and control messages to UAV 140. In other implementations, similar processing may be performed with respect to messages transmitted from UAV 140 to UE 110 via base stations 130. That is, the UAV 140 may change an MCS used for the transmissions, increase the number of transmissions, increase the power level for transmissions, etc., for transmitting information to base stations 130, such as telemetry information indicating the speed, location, direction, etc., at which UAV 140 is flying.

Still further, the processing has described above with respect to achieving a target reliability (e.g., target BLER) associated with communications to/from a UAV. It should be understood that the processing described above may be applied to any scenario in which highly reliable communications are needed over a WWAN.

Further, while series of acts have been described with respect to FIGS. 7A and 7B, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   identifying a network slice to service an unmanned aerial vehicle (UAV);
   assigning the identified network slice to the UAV;
   receiving, from a user equipment (UE) device, a message intended for the UAV;
   transmitting, via the assigned network slice, the message to the UAV;
   receiving, from the UE device, information identifying an error rate associated with the message;
   determining whether the error rate is greater than a threshold error rate; and
   in response to determining that the error rate is greater than the threshold error rate, at least one of:
      modifying a modulation and coding scheme (MCS) associated with transmitting the message to the UAV, or
      retransmitting the message to the UAV at least one time.

2. The method of claim 1, wherein the at least one of modifying or retransmitting comprises:
   reducing an MCS index value associated with the transmitted message to a first index value, and
   retransmitting the message using an MCS corresponding to the first index value.

3. The method of claim 2, further comprising:
   determining that an error rate associated with the retransmitted message is greater than the threshold error rate;
   determining whether the first index value corresponds to a minimum value;
   reducing the first index value to a second index value in response to determining that the first index value does not correspond to the minimum value; and
   retransmitting the message using an MCS corresponding to the second index value.

4. The method of claim 1, wherein the at least one of modifying or retransmitting comprises:
   determining a number of receivers at the UAV;
   determining a number of messages to transmit to the UAV based on the number of receivers at the UAV; and
   transmitting the number of messages to the UAV.

5. The method of claim 4, wherein the determining the number of message to transmit further comprises:
   determining the number of messages to transmit based on the threshold error rate.

6. The method of claim 1, wherein the at least one of modifying the MCS or retransmitting the message comprises:
   modifying the MCS, and
   retransmitting the message to the UAV a plurality of times.

7. The method of claim 1, further comprising:
   receiving a channel quality index (CQI) value from the UAV in response to the transmitted message; and
   determining a modified MCS index value based on the received CQI value.

8. The method of claim 1, further comprising:
   in response to determining that the error rate is greater than the threshold error rate, increasing a power level for transmitting messages to the UAV.

9. The method of claim 1, wherein the error rate comprises a block error rate (BLER), the method further comprising:
   receiving, from the UAV, an acknowledgement message in response to the message, wherein the acknowledgement message include the BLER.

10. The method of claim 1, wherein the UE device is configured to control the UAV in a beyond visual line of sight (BVLOS) operation, and wherein transmitting the message comprises:
    transmitting, by a base station, a command and control message to the UAV.

11. The method of claim 1, further comprising:
    dynamically modifying at least one of the MCS or a number of times to retransmit messages to the UAV while the UAV is in flight based on received error rate information.

12. A system, comprising:
    at least one device comprising a processor, wherein the at least one device is configured to:
       identify a network slice to service an unmanned aerial vehicle (UAV),
       assign the identified network slice to the UAV,
       receive, from a user equipment (UE) device, a message intended for the UAV,
       transmit, via the identified network slice, the message to the UAV,
       receive, from the UE device, information identifying an error rate associated with the message,
       determine whether the error rate is greater than a threshold error rate, and
       in response to determining that the error rate is greater than the threshold error rate, at least one of:
          modify a modulation and coding scheme (MCS) associated with transmitting the message to the UAV, or
          retransmit the message to the UAV at least one time.

13. The system of claim 12, wherein the at least one of modifying or retransmitting comprises modifying the MCS, and when modifying, the at least one device is configured to:
    reduce an MCS index value associated with the transmitted message to a first index value, and
    retransmit the message using an MCS corresponding to the first index value.

14. The system of claim 13, wherein the at least one device is further configured to:
    determine that an error rate associated with the retransmitted message is greater than the threshold error rate,
    determine whether the first index value corresponds to a minimum value,
    reduce the first index value to a second index value in response to determining that the first index value does not correspond to the minimum value, and
    retransmit the message using an MCS corresponding to the second index value.

15. The system of claim 12, wherein when at least one of modifying or retransmitting, the at least one device is further configured to:
    determine a number of receivers at the UAV,
    determine a number of messages to transmit to the UAV based on the number of receivers at the UAV and the threshold error rate, and
    transmit the number of messages to the UAV.

16. The system of claim 12, wherein when at least one of modifying the MCS or retransmitting the message, the at least one device is configured to:
    modify the MCS, and
    retransmit the message to the UAV a plurality of times.

17. The system of claim 12, wherein in response to determining that the error rate is greater than the threshold error rate, the at least one device is further configured to:
increase a power level for transmitting messages to the UAV.

18. The system of claim 12, wherein the at least one device comprises a base station, wherein the base station is configured to:
dynamically modify at least one of the MCS or a number of times to retransmit messages to the UAV while the UAV is in flight based on received error rate information.

19. A non-transitory computer-readable medium having stored thereon sequences of instructions which, when executed by at least one processor, cause the at least one processor to:
receive, from a user equipment (UE) device, a message intended for an unmanned aerial vehicle (UAV);
transmit, via a selected network slice, the message to the UAV;
receive, from the UE device, information identifying an error rate associated with the message;
determine whether the error rate is greater than a threshold error rate; and
in response to determining that the error rate is greater than the threshold error rate, at least one of:
modify a modulation and coding scheme (MCS) associated with transmitting the message to the UAV, or
retransmit the message to the UAV at least one time.

20. The non-transitory computer-readable medium of claim 19, wherein the instructions further cause the at least one processor to:
dynamically modify at least one of the MCS or a number of times to retransmit messages to the UAV while the UAV is in flight based on received error rate information.

* * * * *